Oct. 11, 1966 R. L. WILLIAMS ETAL 3,277,791
MOTION RESPONSIVE DEVICES
Filed March 30, 1965
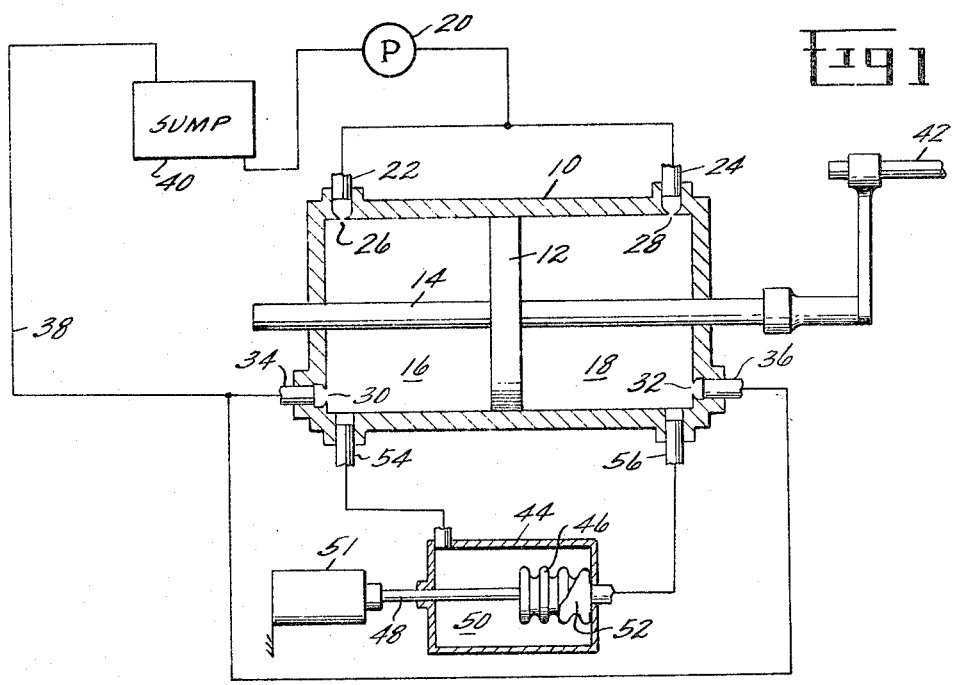
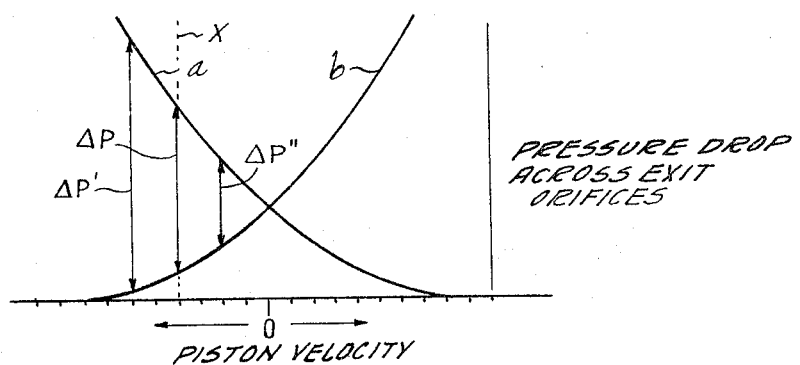
INVENTORS.
RAYMOND L. WILLIAMS
WILLIAM R. SPENCER
BY
ATTORNEY

United States Patent Office 3,277,791
Patented Oct. 11, 1966

3,277,791
MOTION RESPONSIVE DEVICES
Raymond L. Williams and William R. Spencer, Cincinnati, Ohio, assignors to General Electric Company, a corporation of New York
Filed Mar. 30, 1965, Ser. No. 443,828
10 Claims. (Cl. 91—47)

The present invention relates to improvements in motion responsive devices and more particularly to such devices which are employed to provide restraining forces and/or a control signal reflecting rate of movement.

While not necesarily limited to a particular application, the present invention was motivated by the need to provide a control signal which would have a straight line relationship to the rate of movement of actuators employed in turbojet engines. Further to this was the need for providing such a signal which would be relatively unaffected by wide variations in temperatures.

In broad terms it is known to employ buffering devices in the form of dash pots which are connected to a linkage and provide a restraining force for the linkage. Such devices comprise a variable volume chamber in which a pressure is built up as a result of movement of the linkage and this pressure in turn reflects rate of movement of the linkage. The restraining force and the pressure in the variable volume chamber are a function of the manner in which liquid is discharged from this chamber. Where the fluid is discharged from such chamber of devices through an orifice, the action of the device is relatively unaffected by changes in liquid viscosity and useable over a wide temperature range. However, the resistive force and/or the measurable pressure change at low rates of movement is extremely small and of little use for many applications. This resistive force increases along a parabolic curve so that its use over a wide range of velocity rates is difficult. Alternatively it is known to discharge the liquid of such devices through a capillary tube. The output force or signal increases linearly in a desirable fashion. However, this type of device is extremely sensitive to viscosity changes which would result from variations in temperature and therefore is unsuitable for many uses as in an aircraft control system.

Therefore, one object of the present invention is to provide a simple and reliable motion responsive device suitable as a buffering mechanism and adaptable as a motion rate transducer and which is substantially unaffected by wide variations in temperature and further is responsive to mechanical movement as a straight line function of velocity.

More broadly the objects of the present invention are to provide an improved and simplified motion responsive device as well as an improved and simplified motion rate transducer.

In accordance with the present objects, a motion restraining device is provided in which a piston is reciprocable within a cylinder. Liquid is circulated through a chamber at one end of the piston, being introduced through an inlet orifice and discharged through an outlet orifice whereby movement of the piston to vary the size of the chamber will vary the rate of flow through the outlet orifice resulting in a variation in the effective force on the piston as well as a variation of the pressure within said chamber. The piston thus may be employed to provide a restraining force for a buffering force on the linkage or the like which force will increase in direct proportion to velocity or rate of movement of the linkage. Similarly, the pressure within the chamber will also vary as a function of velocity and means responsive to the pressure within the chamber may be employed to derive a control signal which has a strength proportional to velocity.

Advantageously the piston above referred to defines two chambers on opposite sides thereof. Means are provided for maintaining flow of liquid through each of the chambers with the liquid passing through inlet and outlet orifices respectively provided for each of such chambers. Preferably the outlet orifices are substantially larger than the inlet orifices so that as movement of the piston occurs, one chamber is increased and the other is simultaneously decreased, causing a variation in liquid flow through the two outlet orifices. The pressure differential between these two outlet orifices increases as an essentially straight line function of velocity and acts as the restraining force on the piston as well as on the linkage which would be connected thereto.

The pressure differential between these two chambers is then employed in combination with pressure responsive means to derive a control signal having a magnitude proportionate to the velocity of the linkage as an essentially straight line function. Advantageously the control signal may be mechanical and derived from a bellows or corresponding device which is displaced a distance proportionate to the pressure differential between the two chambers on the opposite sides of the piston.

The above and other related objects and features of the invention will be apparent from a reading of the following description of the disclosure found in the accompanying drawing and the novelty thereof pointed out in the appended claims.

In the drawing:

FIG. 1 is a diagrammatical illustration of mechanism embodying the present invention; and FIG. 2 is a plot of pressure relationships existing in the device seen in FIG. 1.

The mechanism seen in FIG. 1 comprises a cylinder 10 in which a piston 12 reciprocates. The piston 12 is double ended in that a piston rod 14 secured thereto projects through opposite ends of the cylinder 10. Means are provided for maintaining a quiescent flow of liquid through chambers 16 and 18 on opposite sides of the piston 12. These means comprise a pump 20 which discharges pressurized liquid to conduits 22 and 24 so that liquid is introduced into the chambers 16 and 18 through sharp edged orifices 26 and 28 respectively. From chambers 16 and 18 the liquid flows through sharp edged orifices 30, 32 respectively and is returned through conduits 34, 36 and a common conduit 38 to a sump 40 where it is available for recirculation by the pump 20.

The device as thus far described may be advantageously employed as a buffering mechanism to provide a restraining force, the magnitude of which is a direct function on the rate of movement of the member being restrained. The mechanism is capable of providing predetermined restraining forces over wide temperature ranges, since the buffering action is essentially insensitive to changes in liquid viscosity caused by different temperature conditions.

To illustrate use as a buffering mechanism, one end of the piston rod 14 is shown connected to a link 42 for which a restraining or buffering force is desired to be proportional to its rate of movement. When the linkage 42 is at rest, there is a quiescent flow of liquid through the chambers 16 and 18. The orifices 26, 28 and 30, 32 respectively are of identical size, as are the conduits carrying liquid to and from the chambers 16 and 18. The pressures in the chambers 16 and 18 are therefore equal and the forces on piston 12 are equal and opposite. This static relationship holds true regardless of the relative position of the piston 12 in the cylinder 10. Appropriate limits would normally be provided to prevent the piston 12 from being displaced to a position interfering with liquid flow through the orifices.

It will be noted that the orifices 30, 32 are respectively larger than the orifices 26, 28 and preferably about by an area ratio of approximately 4:1. Thus the pressure drop across the inlet orifices 26, 28 is much greater than that across the outlet orifices 30, 32. When the piston 12 is displaced, changes in liquid flow rate will preferentially occur in the orifices 30 and 32. This means that liquid flow through the orifices 26, 28 remain substantially constant, so that when there is piston movement, the changes in flow rate through the orifices 30 and 32 are quite high and consequently the changes in the pressure drops thereacross are proportionately large. This relationship is illustrated in FIG. 2 by curve $a$ which indicates that the pressure drop across the exit orifice 30 increases when the piston 12 is displaced towards the left from a stationary position, and that the rate of pressure increase is a non-linear function of velocity. Corresponding, the pressure drop across the exit orifice 32, as indicated by curve $b$, decreases in a non-linear fashion as the piston is displaced toward the left with increasing velocity. Conversely, when the piston 12 is moved toward the right from a stationary position, the pressure drop across the discharge orifice 32 increases non-linearly and the pressure drop across the orifice 30 decreases in a non-linear fashion.

Reverting again to an assumed condition of the linkage 42 and piston 12 being stationary, it will be seen that the pressure drops across the discharge orifices 30 and 32 are equal, and therefore the pressures on opposite sides of the piston 12 are also equal. Assuming next that the linkage 42 is displaced toward the right at a velocity rate represented by line $x$ in FIG. 2, the restraining on the piston 12 will be essentially the difference between the pressure drops across the orifices 30, 32 represented by the output $\Delta P$. Since the curves $a$ and $b$ in FIG. 2 are parabolic and a function of the square of the velocity of the piston 12, these squared functions cancel each other out so that the restraining force represented by $\Delta P$ is a linear function of piston velocity. This is illustrated by output differential pressures $\Delta P'$ and $\Delta P''$ in FIG. 2 for greater and lesser velocity rates. It will thus be apparent that the restraining force or buffering force on the linkage 42 increases as a direct, essentially straight line function of its velocity.

It was previously pointed out that the areas of the outlet orifices 30, 32 are preferably four times as great as the areas of the inlet orifices 26, 28. This relationship is of importance in obtaining the essentially straight line relationship between rate of piston movement and restraining force. Since the pressure drops across the inlet orifices are considerably greater than that across the outlet orifices, variations in pressure within the chamber 16 and 18 (as a result of piston movement) will have a minimal effect on the rate of liquid flow through the inlet orifices and consequently the restraining force may for practical purposes be taken as the $\Delta P$ indicated in FIG. 2. It has been found that so long as the areas of the outlet orifices are twice as great as the areas of the inlet orifices, and preferably four times as great, the increase in restraining force gives a straight line relationship which may be satisfactorily employed in many applications.

The present device may also be employed as a transducer to provide an output which indicates the rate of movement of the linkage 42. In the present embodiment this output signal is mechanical and takes the form of the magnitude of displacement of a rod.

To this end a second cylinder 44 is provided. The cylinder 44 may be physically located adjacent or remote from the cylinder 10 to meet the design requirements for a given installation. A bellows 46 is mounted within the cylinder 44 and has a rod 48 secured to the free end thereof and projecting beyond the end of the cylinder 44. The bellows 46 divides the cylinder 44 into two chambers 50 and 52, being defined by the inner and outer surfaces of the bellows 46 respectively. The chamber 50 is connected by conduit 54 to the chamber 16 and the chamber 52 is connected by conduit 56 to the chamber 18. When the piston 12 is at rest (as would also be the linkage 42), the pressures in the chambers 50 and 52 are equal and the piston rod 48 is maintained in its neutral or null position. If, as a result of linkage movement, the piston 12 is displaced toward the left, the pressure in chamber 50 is increased and the pressure in chamber 52 is decreased since they reflect the pressures in chambers 16 and 18. This pressure differential, which can be assumed to be $\Delta P$, as shown in FIG. 2, causes displacement of the rod 48 a distance which is a direct function of the rate of movement of the linkage 42. Since the pressure differentials $\Delta P$, $\Delta P'$, and $\Delta P''$ have previously been shown to have a straight line relationship with piston (linkage) velocity, the extent to which the piston rod 48 is displaced is also a linear function. In this connection it will be noted that the pressure differential between chambers 50 and 52 is effective against the spring force of the bellows 46 and this can be considered to also be a linear constant. It will be apparent that movement of the piston 12 toward the left causes the rod 48 to be retracted. Conversely movement of the piston 12 toward the right would cause extension of the piston rod 48 in the same fashion, with the extent of displacement being a direct and essentially straight line function of the velocity of the linkage 42. It will also be apparent that the extent of the displacement of the rod 48 will vary, not as a function of the extent of displacement of the piston 12, but as a function of its velocity.

It will also be noted that the restraining force represented by $\Delta P$ in FIG. 2 and the output movement of the rod 48, i.e. the output signal of the rate transducer, are relatively unaffected by changes in the viscosity of the circulating liquid and that reliable and repeatable outputs may be obtained over a wide temperature range. The selection of a liquid is not critical and can be made by one skilled in the art to best meet the conditions of a specific application.

The magnitude of displacement of the rod 48 may be converted into electrical energy by connecting it to the core of a linearly variable differential transformer indicated at 51 in FIG. 1, and the output of this linearly variable differential transformer then employed to provide a control signal accurately reflecting the rate of movement of the linkage 42. The output of the linearly variable transformer may be used as a rate anticipation means or in other known fashions in control systems.

Rod 48 could also be connected directly to a control element, such as a valve, so that its movement would be directly utilized as a control means. From this it will be understood that the present disclosure will suggest various modifications to those skilled in the art, and the scope of the present concept is therefore to be derived from the following claims.

Having thus described the invention, what is claimed as novel and desired to be secured by Letters Patent of the United States is:

1. A motion restraining device comprising,
a cylinder means,
a piston means reciprocable therein,
said cylinder means and piston means defining chamber means,
an inlet and an outlet orifice communicating with said chamber means, the area of said outlet orifice being greater than the area of said inlet orifice,
means for maintaining an uninterrupted flow of liquid into and out of said chamber means with the liquid passing through said orifices, and producing a liquid force on said piston means which varies with movement of said piston means, and
means for providing an opposing force on said piston means which is equal to that provided by said liquid when the piston means is at rest and varies inversely with the liquid force during piston movement.

2. A motion rate transducer comprising,
a cylinder means,
a piston means reciprocable therein, said cylinder means and piston means defining chamber means, an inlet and an outlet orifice communicating with said chamber means, the area of said outlet orifice being greater than the area of said inlet orifice, means for maintaining an uninterrupted flow of liquid into and out of said chamber means with the liquid passing through said orifices, and producing a liquid force on said piston means which varies with movement of said piston means, means for providing an opposing force on said piston means which is equal to that provided by said liquid when the piston means is at rest and varies inversely with the liquid force during piston movement, and means connected to said chamber means and responsive to changes in pressures therein as a result of piston means movement for generating a signal which is proportionate to the rate of movement of said piston means.

3. A motion rate transducer comprising,
a cylinder means,
a piston means reciprocable therein,
said cylinder means and piston means defining a chamber means,
an inlet and an outlet orifice communicating with said chamber means, the area of said outlet orifice being greater than the area of said inlet orifice,
means for maintaining an uninterrupted flow of liquid into and out of said chamber means with the liquid passing through said orifices, and producing a liquid force on said piston means which varies with movement of said piston means,
means for providing an opposing force on said piston means which is equal to that provided by said liquid when the piston means is at rest and varies inversely with the liquid force during piston movement,
a bellows, defining at least in part a pressure chamber,
means connecting said pressure chamber and said cylinder means whereby the extent of expansion of the bellows is a function of the pressure in said cylinder means,
one end of said bellows being displaceable and having a control element secured thereto whereby the displacement of said control element from a null position when the piston means is at rest will indicate the rate of movement of said piston means.

4. A motion restraining device comprising,
a cylinder,
a piston reciprocable therein,
said cylinder and piston defining first and second chambers respectively on opposite sides of the piston,
first and second inlet and first and second outlet orifices respectively communicating with said chambers, the areas of said outlet orifices being greater than the areas of said inlet orifices,
means for maintaining an uninterrupted flow of liquid in each of said chambers with the liquid respectively passing through said first and second inlet and outlet orifices,
whereby movement of said piston will be resisted by a force which progressively increases with the rate of movement of said piston.

5. A motion restraining device comprising,
cylinder means,
piston means reciprocable therein,
said cylinder and piston means defining chambers on opposite sides of said piston means, and means for maintaining an uninterrupted flow of liquid in and through each of said chambers, and
means for permitting discharge of liquid from said chambers at controlled inverse rates as the piston means are displaced in a given direction,
whereby movement of said piston means will be resisted by a force which increases progressively with the rate of movement of said piston means.

6. A motion rate transducer comprising,
a cylinder,
a piston reciprocable therein,
said cylinder and piston defining first and second chambers respectively on opposite sides of the piston,
first and second inlet and first and second outlet orifices respectively communicating with said chambers, the areas of said outlet orifices being greater than the areas of said inlet orifices,
means for maintaining an uninterrupted flow of liquid in each of said chambers with the liquid respectively passing through said first and second inlet and outlet orifices,
means connected to said chambers and responsive to a differential pressure therebetween as a result of piston movement for generating a signal which is proportionatffie to the rate of movement of said piston.

7. A motion restraining device comprising,
a cylinder,
a piston reciprocable therein,
said cylinder and piston defining first and second chambers respectively on opposite sides of the piston,
first and second inlet and first and second outlet orifices respectively communicating with said chambers,
said orifices being of the thin plate type, the pressure drops across which are relatively unaffected by viscosity changes in the liquid,
both of said inlet orifices being of the same area and the areas of said outlet orifices also being the same and at least twice as great as the areas of said inlet orifices,
means for maintaining a constant flow of liquid in each of said chambers with the liquid respectively passing through said first and second inlet and outlet orifices, the rate of the liquid flow being maintained at a level sufficient to prevent reverse flow of liquid through said outlet orifices as a result of piston movement,
whereby movement of the piston will be resisted by a force which progressively increases as an essentially straight line function proportionate to the rate of movement of said piston.

8. A motion restraining device as in claim 7 wherein the area of each outlet orifice is at least four times as great as the area of the inlet orifices.

9. A motion rate transducer comprising,
a cylinder,
a piston reciprocable therein,
said cylinder and piston defining first and second chambers respectively on opposite sides of the piston,
first and second inlet and first and second outlet orifices respectively communicatng with said chambers,
said orifices being of the thin plate type, the pressure drops across which are relatively unaffected by viscosity changes in the liquid,
both of said inlet orifices being of the same area and the areas of said outlet orifices also being the same and at least twice as great as the areas of said inlet orifices,
means for maintaining a constant flow of liquid in each of said chambers with the liquid respectively passing through said first and second inlet and outlet orifices, the rate of liquid flow being maintained at a level sufficient to prevent reverse flow of liquid through said outlet orifices as a result of piston movement,
means connected to said chambers and responsive to a differential pressure therebetween as a result of piston movement for generatng a signal which is proportionate to and essentially a straight line function of the rate of movement of said piston.

10. A motion rate transducer as in claim 9 wherein the means connected to said chambers comprise,
a second cylinder, a bellows mounted within said second cylinder with one end thereof free, a rod secured to the free end of said bellows and projecting from said cylinder to provide a mechanical signal takeoff, said bellows dividing said second cylinder into two chambers, conduits respectively connecting one of said piston chambers with one of the chambers in said second cylinder and connecting the other piston chamber with the other chamber in said second cylinder, whereby the extent of displacement of said rod is a function of the rate of movement of said piston.

References Cited by the Examiner

UNITED STATES PATENTS

| | | | |
|---|---|---|---|
| Re. 24,410 | 12/1957 | Drake | 91—47 X |
| 381,571 | 4/1888 | Mills | 60—57 X |
| 2,305,971 | 12/1942 | Livingston et al. | 73—497 |
| 2,317,383 | 4/1943 | Hull | 91—52 X |
| 2,873,104 | 2/1959 | Horwood | 73—502 |
| 2,945,677 | 7/1960 | Kammerer | 60—52 X |
| 3,023,625 | 3/1962 | Clement et al. | 73—502 |

EDGAR W. GEOGHEGAN, *Primary Examiner.*